July 8, 1947.  P. E. MERCIER  2,423,462
FLEXIBLE COUPLING FOR EXHAUST CONDUITS OF INTERNAL-COMBUSTION ENGINES
Original Filed May 4, 1943
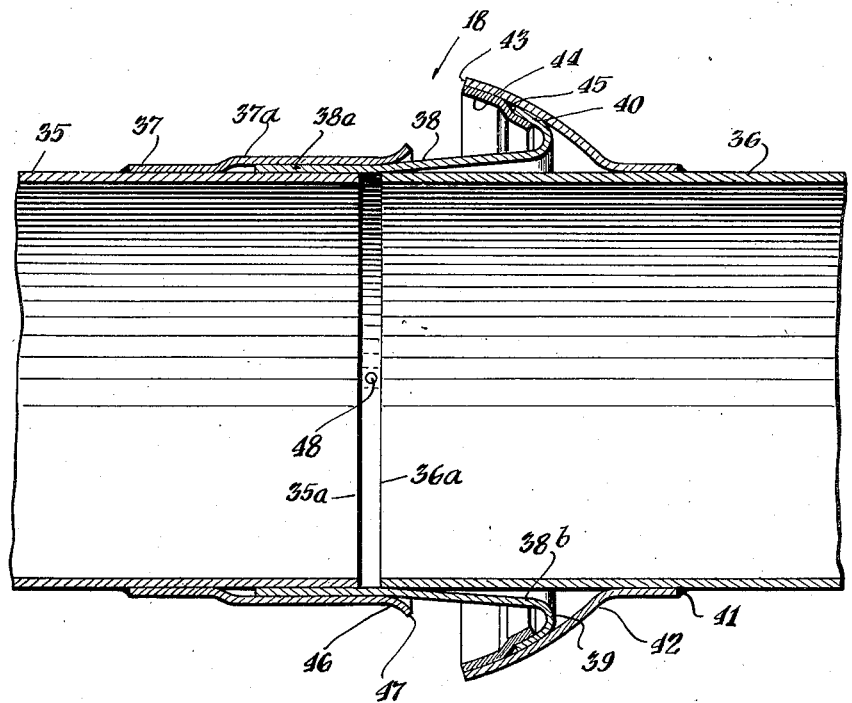
INVENTOR
*Pierre Ernest Mercier*
BY
*George H. Corley*
ATTORNEY Patented July 8, 1947

2,423,462

UNITED STATES PATENT OFFICE 2,423,462

FLEXIBLE COUPLING FOR EXHAUST CONDUITS OF INTERNAL-COMBUSTION ENGINES

Pierre Ernest Mercier, Neuilly, France

Original application May 4, 1943, Serial No. 485,593. Divided and this application November 28, 1945, Serial No. 631,362

1 Claim. (Cl. 285—185)

This invention relates to an improved coupling, and particularly to a flexible coupling adapted for use in establishing a fluid type connection in exhaust pipes or between the exhaust manifold and the exhaust pipe of an internal combustion engine, such as is used, for example, in aeroplanes and other vehicles where the coupling and the joined conduits are subjected to extremes of temperature variations and also to vibrations when in use.

It is an object of the invention to provide a flexible coupling which may be readily dismantled and reassembled without expensive and tedious welding or riveting operations.

It is a further object of the invention to provide a flexible coupling that functions to maintain an effective sealing connection between adjacent ends of sections of a conduit through a wide range of temperature conditions such as are encountered in engine operation.

Other objects and advantages of the invention will become apparent as the description proceeds.

The single figure of the drawing illustrates a longitudinal section through the coupling and the ends of two sections of a conduit that are to be joined thereby.

As shown in the drawing, the coupling 18 is used to connect two pipes 35 and 36, the ends 35a and 36a of which are shown as spaced a short distance from one another to permit of pivoting action between the two pipes and also for lengthwise expansion. The coupling 18 consists of three main parts, namely a cylindrical collar 37 attached adjacent one end to the pipe 35 by welding, riveting or other suitable means. The main portion 37a is free and is slightly spaced concentrically from the outer surface of the pipe 35, forming therebetween an annular slot in which is received the end of a sealing collar 38 having at one end a cylindrical portion 38a adapted to snugly fit about the end of the pipe 35. This cylindrical portion merges into a slightly outwardly flared portion 38b which continues to expand until it is turned backwardly at 39 to form a locking ring 40.

Fixed to the pipe 36 at 41 there is a bell-shaped member 42. This member is joined adjacent its outer end to an inwardly directed annular strip 44, which is slightly spaced from the member 42 on its side nearest the pipe 36, thereby forming a sealing groove 45. When assembeld to form a joint or coupling, the turned back portion 39 of the sealing collar 38 is snugly fitted in the sealing groove 45 and at the other end the portion 38a is snugly received in the annular groove between the member 37a and the end of the pipe 35. The end of the collar 37 is flared outwardly at 46 to provide a thin cooling fin 47. In a similar manner the outwardly extending rim portion 43 of the member 42 serves to act as a cooling fin rapidly giving up heat to passing air and establishing a marked temperature gradient between the temperature of the gases passing through the pipe and the temperature at the rim 43.

Besides functioning to facilitate transfer of heat from the hot exhaust gases to the passing air, which may be circulated by means of a fan or other means, either solely for cooling purposes or to transfer heat from the exhaust gases to the incoming air used to maintain combustion of the fuel introduced into the engine cylinders, the structural arrangement illustrated serves the further important purpose of causing the sealing collar 38 to be sealed more tightly at its two ends during operation of the engine than during intervals when the engine is idle. This result may be visualized when it is borne in mind that as the collars are heated by the exhaust gases they will tend to expand more rapidly in the areas closer to the pipes 35 and 36 than in the outer areas where the cooling air has a chance to pass over the extended fin surfaces. Because of the unequal expansion, there will be a tendency for the free end of the strip 44 to be pivoted counterclockwise and press closer against the locking ring 40. Likewise the cooling fin 47 and the adjacent portions of the collar 37 will tend to expand less than the portions thereof closer to the connection with the end of the pipe 35. This will tend to cause the free end of the collar 37 to bear closer against the sealing member 38 at or adjacent the pivotal axis of the coupling, which is indicated at 48 in the drawing as located at a point in the longitudinal axes of the pipes 35 and 36 and approximately equi-distant from the adjacent ends of these pipes.

The coupling 18 will generally be made of relatively light gauge sheet metal, thus facilitating the transmission of heat to passing air by the fins and at the same time emphasizing the heat gradient between these fins and the temperature of the main portions of the elements of which these fins are a part. As a consequence a deforming action is established which promotes the sealing contact between the loose sealing collar and the adjacent attached collars.

It will be apparent that my improved coupling has the further advantage that it may be easily assembled without recourse to welding, riveting or bolting, and that it may be quickly dismantled when the engine is to be taken down for repairs or overhauling.

Although I have emphasized the pivoting action in the coupling, it will be understood that it has the additional attribute of permitting considerable lengthwise expansion and contraction without setting up undesired stresses in the pipes or joints thereof with the manifold of an internal combustion engine or with the flange connection to an engine exhaust port.

The coupling and the associations thereof in an exhaust manifold assembly may be modified in various respects without departing from the scope of the invention, which is not to be deemed as limited otherwise than as limited by the scope of the appended claim.

The instant application is a division of application Serial No. 485,593, filed May 4, 1943, now Patent No. 2,388,924, dated November 13, 1945.

I claim:

In a flexible coupling for engine exhaust conduits and the like, a pair of fixed collars respectively secured at one end adjacent one end of the two pipes to be joined and at their other ends flared outwardly away from said pipes, said members having their flared ends extending generally toward one another when the ends of the pipes are brought into proximity to one another and a third collar member having a cylindrical portion at one end adapted to be brought into a press fit engagement between the end of one of said pipes and the collar fixed thereto and having its other end flared first gradually outwardly and then backwardly, said backwardly turned portion being adapted to be brought into interlocking sealing engagement with a cooperating outwardly flared part of the fixed collar carried by said adjacent pipe.

PIERRE ERNEST MERCIER.